United States Patent

Nozawa et al.

[15] 3,669,457

[45] June 13, 1972

[54] CASSETTE-LOADING MEANS FOR CASSETTE TAPE RECORDER

[72] Inventors: Yoshikuni Nozawa; Mitsuo Ishikawa; Junjiro Kikuchi, all of Nagano, Japan

[73] Assignee: Sankyo Kogaku Kogyo Kabushiki Kaisha, Nagano, Japan

[22] Filed: March 2, 1970

[21] Appl. No.: 15,695

[30] Foreign Application Priority Data

March 3, 1969 Japan....................................44/16397
March 3, 1969 Japan....................................44/19205
March 3, 1969 Japan....................................44/19206
July 24, 1969 Japan....................................44/70748
July 28, 1969 Japan....................................44/72084

[52] U.S. Cl. ..........................274/4 E, 179/100.2 Z, 242/199
[51] Int. Cl. ..........................................................G11b 15/24
[58] Field of Search .................................274/4 C, 4 E, 11 C; 242/197–200; 179/100.2 Z

[56] References Cited

UNITED STATES PATENTS 3,395,871 8/1968 Ackermann............................274/4 E
3,400,936 9/1968 Staar.....................................274/4 E
3,542,370 11/1970 Laa.......................................274/4 E
3,494,572 2/1970 Uemura.................................274/4 E

*Primary Examiner*—Leonard Forman
*Assistant Examiner*—Dennis A. Dearing
*Attorney*—Waters, Roditi, Schwartz & Nissen

[57] ABSTRACT

A tape cassette-loading means including a tape cassette receiving means which is mounted on a tape recorder for upward and downward movement between a lowered operating position and a raised non-operating position. The cassette receiving means is provided with a cassette ejector to eject the tape cassette out of the receiving means thereby permitting it to be easily withdrawn or removed. As the tape cassette is manually inserted into the receiving means against the action of the ejector, the sliding movement of the cassette results in the automatic lowering of the receiving means to the lowered operating position where the tape cassette is in operative association with the tape recorder elements. The cassette receiving means is operatingly connected to the tape recorder body through at least two parallel-extended levers which are pivotally articulated at their opposite ends to the receiving means and the tape recorder body, respectively, so that the receiving means undergoes the vertical movement while constantly maintaining a parallel relation to the tape recorder base.

8 Claims, 17 Drawing Figures

CASSETTE-LOADING MEANS FOR CASSETTE TAPE RECORDER

The present invention relates to a tape recorder and, more particularly, to a novel and improved tape cassette-loading means for a cassette type tape recorder.

It is a primary object of the present invention to provide an improved and novel tape cassette-loading means including therein a tape cassette receiving means which may undergo vertically upward and downward movement while constantly maintaining parallel relation with the base surface of the tape recorder, on which there are provided capstan shafts, cassette-locating pins, reel shafts and the like.

It is another object of the present invention to provide an improved and novel cassette-loading means wherein the cassette receiving means may move downwardly from its raised non-operating position to its lowered operating position while constantly maintaining parallel relation with the base surface of the tape recorder and further be held in the basic or lowered operating position with stability.

It is another object of the present invention to provide an improved and novel cassette-loading means wherein the cassette receiving means may be locked with stability at its raised non-operating position.

It is further object of the present invention to provide an improved and novel cassette-loading means in which the cassette receiving means may be locked with stability at its raised non-operating position with the front opening for introduction of the tape cassette being directed or oriented somewhat upwardly to allow the tape cassette to be more easily inserted into or removed from of the cassette receiving means.

These and other objects of the present invention will become apparent to those skilled in the art from the following description of the invention taken with reference to the accompanying drawings, no limitation being intended by the specific terminology utilized and instead reference is made to the appended claims for a precise delineation of the true scope of the present invention.

Figure 1:
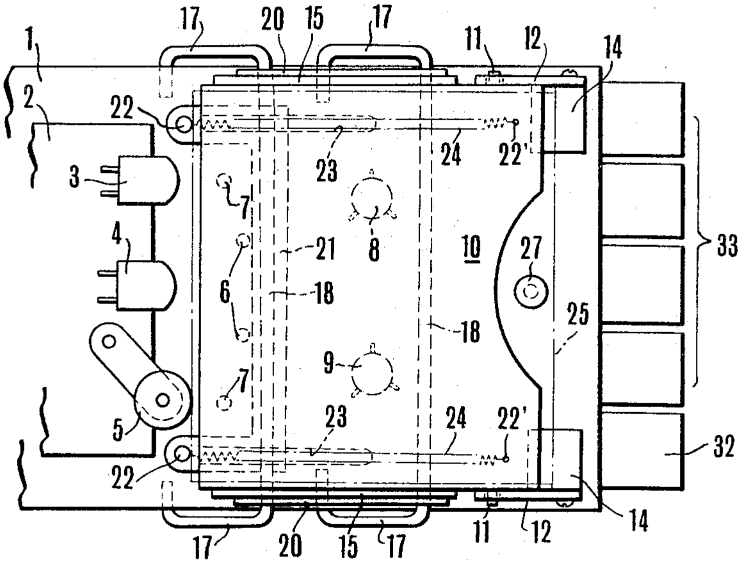
FIG. 1 is a plan view, partly broken away, illustrating a tape recorder having a tape cassette-loading means according to the present invention.
Figure 2:
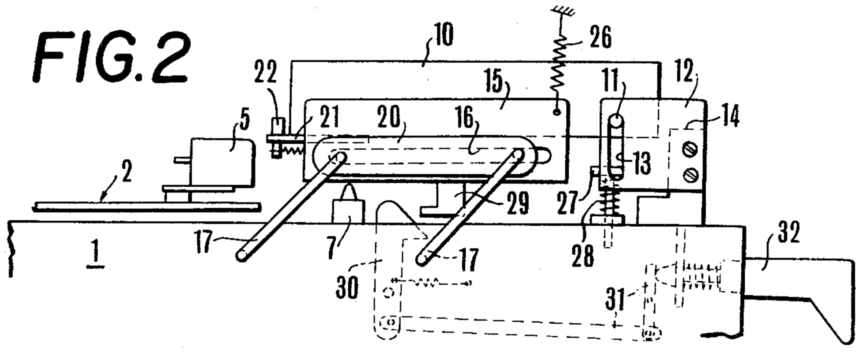
FIG. 2 is a fragmentary side elevational view of the tape recorder shown in FIG. 1.
Figure 3:
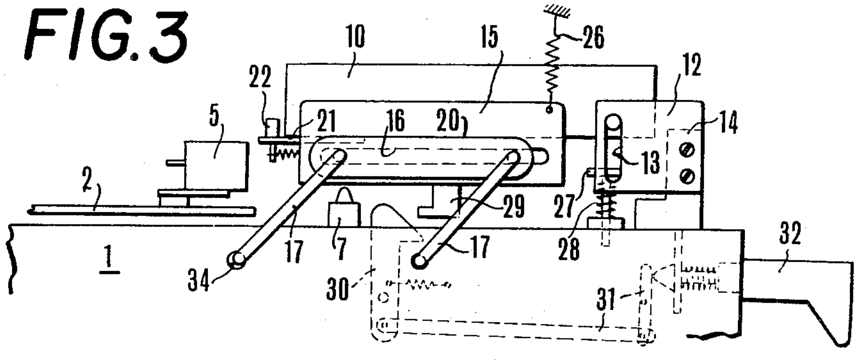
FIG. 3 is a view similar to FIG. 2, but showing the tape recorder incorporating a cassette-loading means according to a second embodiment of the present invention.
Figures 4A, 4B, 4C:
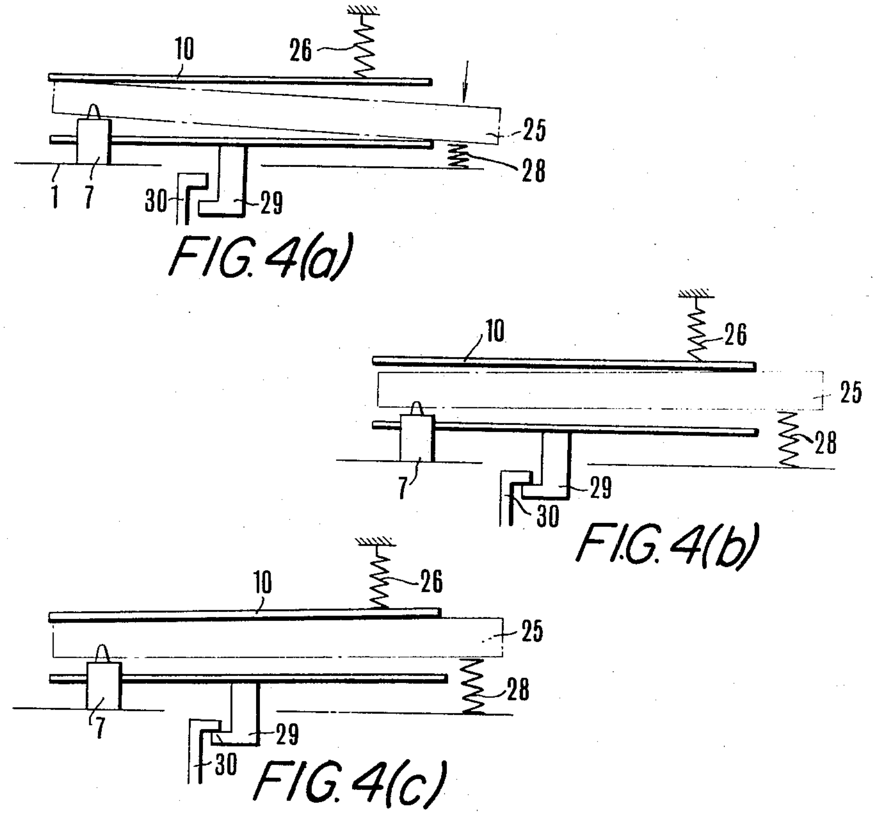
Figure 5:
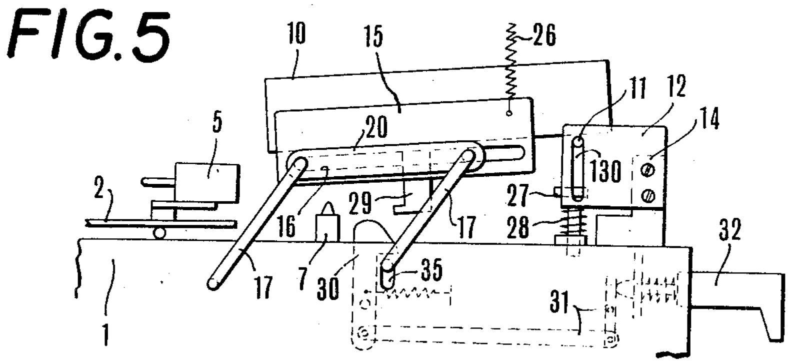
Figure 6:
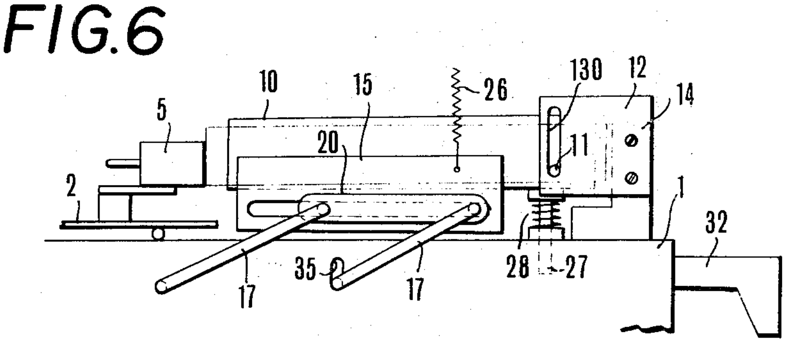
Figure 7:
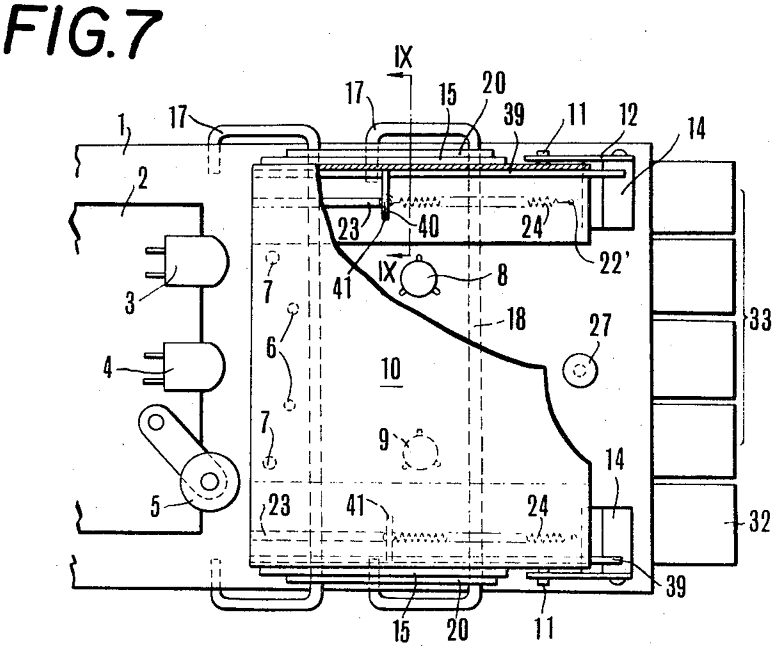
Figure 8:
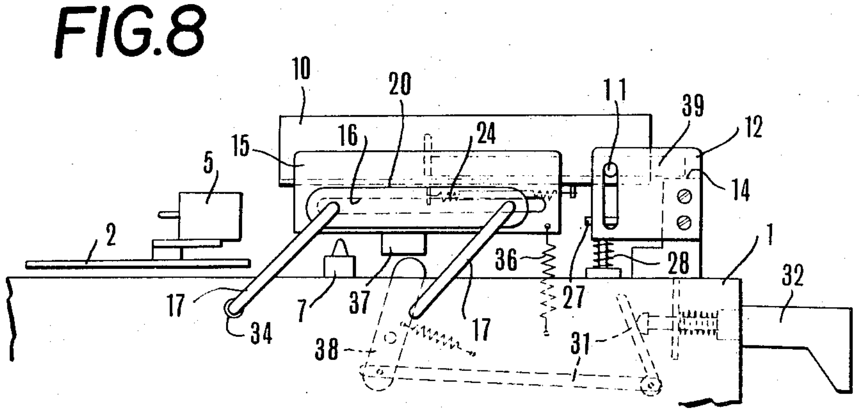
Figure 9:
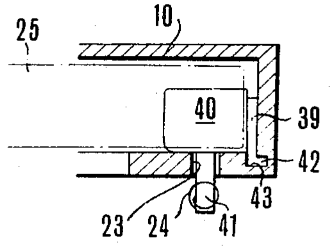
Figure 10A:
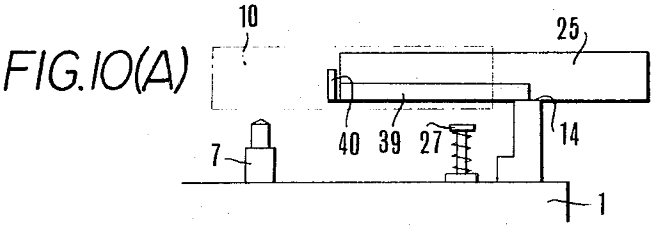
Figure 10B:
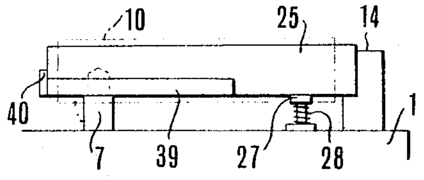
Figure 11:
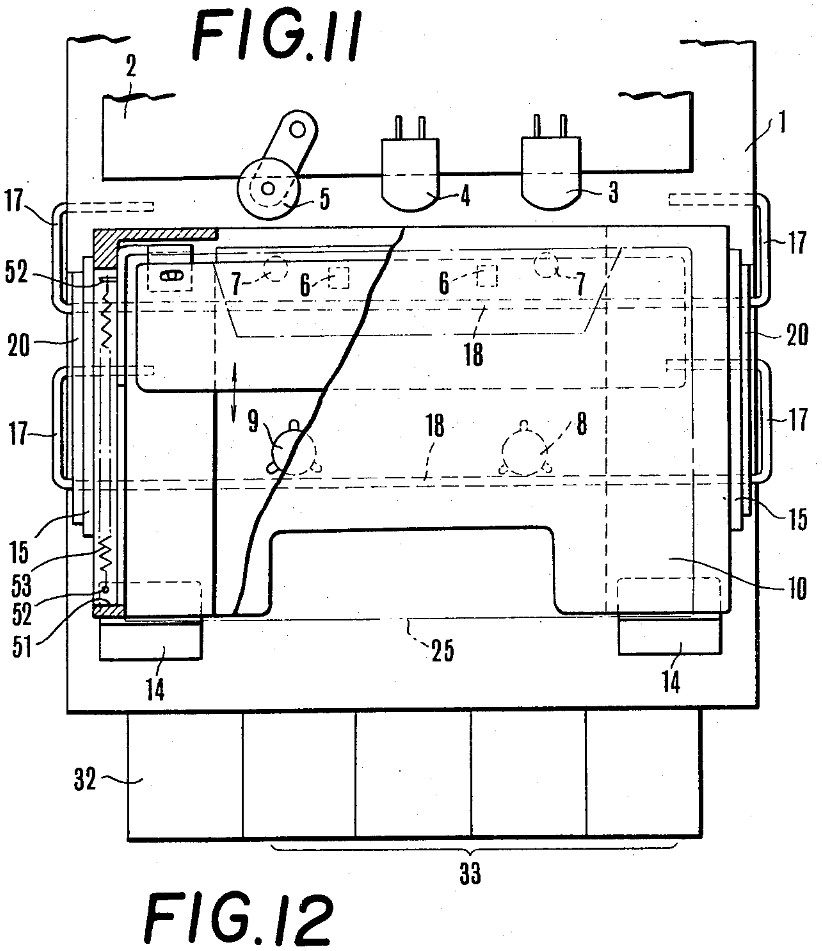
Figure 12:
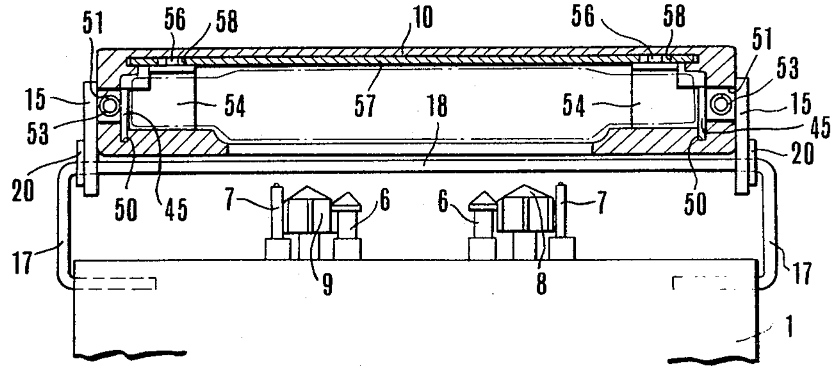
Figure 13:
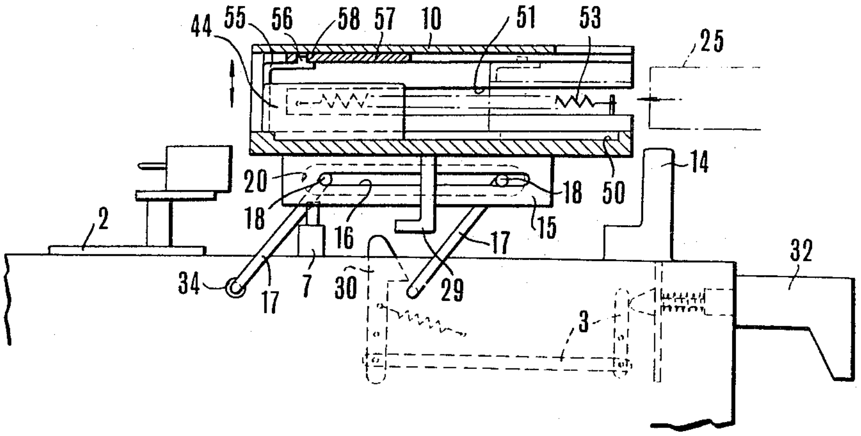

FIGS. 4–*a* to 4–*c* are schematic views illustrating relative relations between the tape cassette and the receiving means, wherein FIG. 4–*a* is a view explanatory of the relation between the cassette and the receiving means when the receiving means comes into its basic operating position while the cassette is still manually depressed downwardly, FIG. 4–*b* is a view explanatory of the relation between the cassette and the receiving means when the receiving means is locked in the basic operating means while the cassette is released from the operator's manual depression in the first embodiment of the present invention shown in FIGS. 1 and 2, and FIG. 4–*c* is a similar view to FIG. 4–*b*, but showing the relation between the cassette and the receiving means in connection with the modified embodiment shown in FIG. 3;

FIG. 5 is a side elevational view of the cassette-loading means according to a third embodiment of the present invention, with the cassette receiving means being shown in its raised non-operating position;

FIG. 6 is a view similar to FIG. 5, but with the cassette receiving means being shown held in the lowered operating position;

FIG. 7 is a plan view, partly broken away, illustrating the cassette type tape recorder having a fourth modification of the cassette-loading means according to the present invention;

FIG. 8 is a side elevational view of the tape recorder shown in FIG. 7;

FIG. 9 is a fragmentary cross-sectional view taken substantially along the line 9 — 9 of FIG. 7;

FIGS. 10A and 10B are schematic views explanatory of insertion of the tape cassette into the cassette receiving means and downward movement of the receiving means to its lowered operating position;

FIG. 11 is a plan view, partly broken away, showing a cassette type tape recorder which is provided with the cassette-loading means according to a fifth embodiment of the present invention;

FIG. 12 is a fragmentary cross-sectional view of the tape recorder shown in FIG. 11;

FIG. 13 is a fragmentary longitudinal-section view thereof; and

Figure 14:
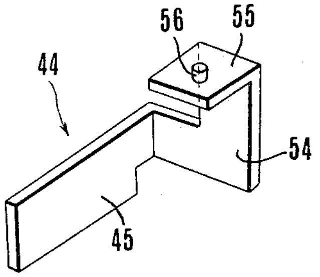

FIG. 14 is a perspective view showing a part of the cassette ejector incorporated in the fifth embodiment shown in FIGS. 11 to 13.

Referring now to FIGS. 1 and 2, there is shown a first embodiment of the tape cassette-loading means constructed in accordance with the present invention. A cassette type tape recorder shown herein is of the type which includes a tape recorder housing 1 and a movable base member 2 which is mounted on the housing 1 for forward and backward movement longitudinally of the housing 1 towards and away from an operative position with respect to a tape cassette 25 loaded in the tape recorder. The movable base member 2 is, as well-known to those skilled in the art, provided thereon with recording/playback elements such as magnetic heads 3 and 4, a pressure roller 5 and the like. It will be also understood that the movable base member 2 is operatingly connected to a suitable manually operable push button in such a way that manual depression of the push button causes the movable base member 2 to move to or away from the inserted tape cassette 25.

The tape recorder housing 1 is, as is the case with the typical prior art cassette type tape recorder, provided on its top panel or base surface with capstan and guide shafts 6, cassette-locating pins 7 and reel shafts 8 and 9 adapted to fit into the hubs of the tape reels in the tape cassette 25.

A cassette receiving means, generally indicated at 10, includes a substantially box-shaped casing which defines a chamber for receiving therein the tape cassette 25 as shown in FIG. 1 in chain-dotted lines. This chamber is bounded by a top and a bottom wall, as well as transversely spaced parallel side walls, the front and rear of the receiving means 10 being left open. The bottom wall is provided at its substantially middle portion with a large opening through which the tape recorder elements such as the capstan and guide shafts 6, reel shafts 8 and 9, cassette-locating pins 7, etc. are permitted to cooperate with coresponding parts in the tape cassette 25. The transversely spaced parallel side walls of the receiving means 10 are, respectively, provided at the front ends thereof, that is, at the right-hand ends as viewed in FIGS. 1 and 2, with horizontal pins 11 which are laterally outwardly extended from the cassette-receiving means 10. These horizontal pins 11 are slidably inserted in vertically elongated slots 13 (particularly refer to FIG. 2) which are, respectively, provided in vertical plate portions of transversely opposed members 12 and 12. The members 12 have horizontal flat surfaces 14, respectively, which function as guide surfaces along which the tape cassette 25 may be introduced or inserted more easily and accurately into the cassette-receiving means 10. Preferably, the top wall of the cassette receiving means 10 is partially cut away at its front transversely extending edge thereby to provide a recessed portion of, for example, semi-circular configuration when being viewed in plan view thereof so that the operator's fingers may exert pushing force upon the cassette 25 until it is completely inserted into the receiving means 10.

Transversely-spaced elongated plates 15 are each mounted on either each side wall of the cassette-receiving means 10 in a depending manner from the receiving means 10. Provided in the elongated plates 15 are respective slots 16 which are extended horizontally and in parallel relation with the cassette-engaging base surface of the tape recorder housing 1 as shown in FIG. 2. A pair of parallel bar members 18 spaced from each other longitudinally of the cassette-receiving means 10, and extend transversely of the receiving means 10 through horizontal slots 16 in the elongated plates 15. Two pairs of opposite arms 17 are formed on the protruding ends of the horizontal bar members 18 and the arms are downwardly thereby to lie in vertical planes substantially at right angles with the main horizontal portions of the bar members 18. The arms 17 are further bent inwardly at their lowest free ends to thereby provide hooked portions extending horizontally and in parallel with the main horizontal middle portions of the bar members 18.

As apparent from FIG. 2, the parallel relationship between the bar members 18 is ensured or maintained by link plates 20 which are each mounted on the slotted plates 15 for longitudinal sliding movement, the plates 20 being provided with a pair of longitudinally spaced perforations through which extend the bar members 18, respectively. The free ends of the arms 17 are fitted for free rotation in holes provided in the side walls of the tape recorder housing 1. It will be understood that the longitudinal spacing of the holes in the side walls of the housing 1 is equal to that between the perforations in the link plate 20. From the foregoing, it will be understood that the arms 17 of the bar members 18 co-operate with the link plates 16 as well as the tape recorder housing 1 to thereby constitute a pair of parallel motion mechanisms which are each on a respective side of the cassette-receiving means 10.

Mounted on the bottom wall of the receiving means 10 is a horizontally plate plate means 21 capable of sliding forward and backward longitudinally of the receiving means 10 through a suitable guide means.

The horizontal plate means 21 has at its rearmost edge a pair of transversely opposed lugs which are, in turn, provided respective vertical pins 22 and 22, Upwardly projecting portions of the vertical pins 22 are introduced in a freely slidable manner into transversely spaced, longitudinally extended slots 23 respectively provided in the bottom wall of the receiving means 10 and open rearwardly. It will be thus appreciated that the upwardly projecting portions of the vertical pins 22 when in the slots 23 in the bottom panel wall of the receiving means 10, may protrude into the interior of the receiving means 10 for purpose as will be herein described in detail.

The downwardly depending portions of the vertical pins 22 are connected, through resilient tension means such as tension springs 24, to fixed pins 22' which are downwardly projected from the bottom wall of the receiving means 10. Accordingly, the horizontal plate means 21 is normally urged, by the action of the tension springs 24, towards the front open end, i.e. the right-hand end, as viewed in FIGS. 1 and 2, of the cassette receiving means 10. Thus, upon insertion of the tape cassette 25 into the cassette receiving means 10, the leading edge of the cassette 25 is abutted against the vertical pins 22 to thereby cause the horizontal plate means 21 to move towards the rear open end, i.e. the left-hand, as viewed in FIGS. 1 and 2, of the receiving means 10 against the yielding force of the tension springs 24. On the contrary when it is required to remove the tape cassette 25 from the receiving means 10, the cassette 25 will be ejected forcibly out of the receiving means 10 by the tension springs 24. It will be apparent, from the foregoing, that the horizontal plate means 21 constitutes a cassette ejector means.

In this regard, it is preferable to provide a suitable stopper means which is adapted to prevent the tape cassette, when being ejected outwardly, from falling completely out of the receiving means 10.

The cassette receiving means 10 is normally urged towards and yieldingly kept at its raised non-operating position by resilient means 26 which has one end connected to a suitable stationary member and an opposite end connected to the receiving means 10 at a particular location that is nearer to the front opened end of the cassette receiving means 10 than the pivotal connection of the link plates 16 with the right-hand 17, as viewed in FIG. 1.

On the cassette-engaging base surface of the tape recorder housing 1, there is provided at least one headed pin 27 at a particular location that is just below the trailing transverse edge of the tape cassette 25 which has been inserted completely into the cassette receiving means 10. The headed pin 27 is normally urged or biased upwardly by a resilient means, for example, a compression spring 28 so that it may be yieldingly abutted against the bottom surface of the tape cassette 25 which has been brought into the lowered operating position together with the receiving means 10, whereby the headed pin 27 serves as a cassette stabilizer to support the cassette 25 in a stable and normal attitude in the receiving means 10.

A substantially L-shaped hooked member 29 as shown in FIG. 2 is mounted on the cassette receiving means 10 and extends downwardly therefrom. The hooked member 29 is arranged such that, when the receiving means 10 reaches its lowered operating position, the hooked member will engage a locking member 30 pivoted in the housing 1, with the result that the receiving means 10 is positively locked in its lowered operating position against upward return movement.

As will be seen in FIG. 2, the locking member 30 is operatingly connected to a manually operable push button 32 through a suitable link mechanism generally indicated at 31 in FIG. 2 in such a manner that manual depression of the push button 32 will cause the locking member 30 to release the engagement with the hooked member 29. It will be thus apparent that, when the hooked member 29 is out of engagement with the locking member 30, the cassette receiving means 10 will move upwardly and return to the raised non-operating position by the action of the tension spring 26 under the control of the parallel motion mechanisms as described above in detail.

In FIG. 1, other push buttons 33 serve to carry out other various operations.

In the previous explanation, it has been assumed that two pairs of arms 17 in the parallel motion mechanisms are arranged on each side of the receiving means 10, and are constituted of end portions of the parallel bar members 18 which are extended traversely of the receiving means 10 as described above. It is obvious, however, that the present invention is not restricted to such construction but can be employed in arrangements where two pairs of parallel link members are separately provided in a substantially U-shaped configuration. It will be understood that the arms 17 are not limited in their individual configurations or designs inasmuch as may be assembled or incorporated with respect to the receiving means 10 and the tape recorder housing 1 so as to provide the necessary parallel motion.

In operation, the tape cassette 25 is first introduced into the front opening of the cassette receiving means 10 from the leading side where the tape portion is exposed. In this manner, the tape cassette 25 is supported in a freely sliding manner upon the transversely opposed cassette-guide surfaces 14 of the transversely spaced members 12 on the housing 1 and then manually inserted, by a thrust force exerted somewhat downwardly upon the trailing end of the tape cassette 25, into the cassette receiving means 10 which is in its raised non-operating position where the upper surface of the bottom wall is flush with the guide surfaces 14. When the tape cassette 25 is manually pushed into the receiving means 10 in the horizontal forward direction, the leading end of the cassette 25 thus placed in the receiving means 10 is abutted against the upward-projecting portions of the transversely spaced vertical pins 22 mounted on the horizontal plate means or cassette ejector means 21. The additional thrust force applied to the cassette 25 will overcome the force of the tension springs 24 such that the cassette 25 will be pushed to the rear, with the cassette ejector means 21 being forced backwardly. When, finally, as a result of the forced movement into the receiving means 10, the trailing end of the cassette 25 is out of engagement with the casette-guide surfaces 14, the receiving means 10 is capable of being lowered, against the action of the tension spring 26, into the basic operating position by the manual force which is still continued to be exerted upon the trailing end of the tape cassette 25. It will be understood that, in the course of this downward movement to the lowered operating position, the receiving means 10 is always maintained in a constantly parallel relation to the cassette-engaging base of the tape recorder housing 1 by the parallel motion mechanisms formed from the two pairs of parallel arms 17 as well under the control function of sliding engagement of the lateral pins 11 in the vertical slots 13 in the members 12. When the cassette receiving means 10 is lowered into the basic operating position, the hooked member 29 is automatically brought into engagement with the locking member 30 whereby the receiving means 10 will be positively locked in the basic operating position against upward return movement. In this condition, of course, the centers of the tape reels in the cassette will automatically come into engagement with the driving means, such as the reel shafts, of the tape recorder. In addition, the tape cassette 25 will be horizontally supported upon the pin 27 which provides stability.

After the tape cassette 25 has been thus loaded in the tape recorder, manual depression of the suitable push button causes the movable base member 2 to advance towards the cassette 25 in the receiving means 10 with the result that the recording/playback elements such as the magnetic heads 3 and 4 and the pressure roller 5 are in engagement with the exposed tape portion thereby to accomplish the recording/playback operation. When it is required to remove the cassette 25 upon completion of the recording/playback operation, the movable base member 2 is firstly returned rearwardly to its initial non-operable location thereby moving the magnetic heads and the pressure roller away from the exposed tape portion in the cassette 25 and then the push button 32 is manually depressed to release the hooked member 29 from the locking member 30. Thereupon, the cassette receiving means 10 is returned to its raised position by the action of the tension spring 26. Upon reaching this raised non-operating position, the two tension springs 24 automatically thrust the cassette ejector means 21 forward and, in this manner, the cassette 25 is forced out from the receiving means 10 by a certain distance. Preferably there is provided a stopper means by which the tape cassette 25, thus ejected is prevented from completely escaping from the receiving means 10.

With the cassette-loading means according to the present invention being constructed as described just above, the insertion of the cassette 25 automatically causes the receiving means 10 to be lowered into the basic operating position, while being maintained in parallel relation with the cassette-engaging base surface of the housing 1, irrespective as to whether the manual thrust force is applied to the cassette 25 in any direction. Thus, the centers of the tape reels in the cassette 25 come into engagement with the driving means of the tape recorder with stability and certainty.

In accordance with the primary feature of the present invention, it is contemplated to provide a novel cassette-loading means in which the arms 17 are pivotally connected at their opposite ends with the receiving means 10 and the housing 1 to form a parallelogram linkage so that the receiving means 10 may be moved only parallel to the housing 1 between the raised and lowered positions. It will be thus seen that, in accordance with the present invention, the pivotal connections and sliding engagements of the arms 17 with the receiving means 10 and the housing 1 are remarkably reduced in number and, therefore, there is less in frictional forces and resistances encountered in the up and down movement of the receiving means 10 as compared with conventional linkage arrangements in which the link levers are pivotally connected to each other substantially halfway between their opposite ends to thereby form a foldable X-shaped linkage. Such parallel arrangement of the arms 17 according to the present invention advantageously ensures stable, easy, soft, troubleproof and smooth operation of the cassette receiving means 10.

FIGS. 3 – 14 illustrate modified cassette-loading means which are each similar to the previously described cassette-loading means, but are improved in stability of the loaded cassette or in convenience for the cassette insertion. Most of the components of the cassette-loading means are the same as previously described. To that extent, the components have been given the same reference characters, so that the previously description will be applicable. The present description will be, therefore, largely confined to the differences between each of modified means and the cassette-loading means described previously.

Referring now to FIG. 3, there is shown a cassette type tape recorder according to a second embodiment of the present invention. This second embodiment is substantially similar in structure to the first embodiment as described previously, with the exception that the rear holes in the side walls of housing 1 are comparatively larger in size as shown at 34 so that lost motion connections are provided on each side of the tape recorder housing 1, between the side wall of the housing 1 and the arms 17 which are remote from the front open end of the receiving means 10. Thus, only one pair of the arms 17 are loosely arranged so as to make a limited lost motion in the larger holes 34.

When the receiving means 10 is completely lowered to the basic operating position and the cassette 25 in the receiving means 10 is still manually depressed at its trailing end, the cassette 25 is, as seen in FIG. 4–*a*, in such tilted condition that the trailing end is at a lower level than the leading end. Now assume that the cassette 25 is released from manual pressure. In the first embodiment where all arms 17 are closely fitted in the holes in the housing 1 in such a manner as to provide no lost motion therebetween, the cassette 25 will remain in the slightly tilted attitude relative to the receiving means 10, as shown in FIG. 4–*b*, because the trailing end of the cassette 25 has a tendency to be pushed up by the action of the compression spring 28 encircling around the headed pin 27. Therefore, there may be produced an adverse clearance between the receiving chamber and the cassette 25 so that the cassette 25 tends to rattle in the receiving means 10.

On the contrary, in the modified embodiment in which the lost motion connections are provided between the housing 1 and that pair of the arms 17 remote from the front end of the receiving means 10, the receiving means 10 is allowed to follow the upward movement of the trailing end of the cassette 25 due to the lost motion connections and the tension spring 26 so that the cassette 25 may be more snugly and securely held in the receiving means 10 with stability as shown in FIG. 4–*c*, as compared with the first embodiment explained previously.

FIGS. 5 and 6 illustrate a cassette type tape recorder having therein cassette-loading means according to a third embodiment of the present invention. This third embodiment is substantially similar in structure to the first embodiment, previously described, with the exception that holes 35, nearer to the front end of the receiving means 10, are vertically elongated in form of slots, respectively, so that the lost motion connections are provided on each side of the tape recorder housing 1 between the side panel wall of the housing 1 and the arms 17 nearer to the front end of the receiving means 10. Thus, the receiving means 10 in its raised non-operating position may be set in such an attitude that the front end is higher than the rear end by a distance corresponding to the vertical length of the slot 35.

According to the third embodiment, when the cassette receiving means 10 is kept in its raised non-operating position by the action of the tension spring 26, the arms 17 are upwardly shifted, as particularly seen in FIG. 5, in a slightly staggered relation to the rear pair of the arms. Consequently, the receiving means 10 may be held in this raised non-operating position in such an attitude that the front end of thereof is tilted up with a small angle of elevation for convenience of the insertion-removal operation of the tape cassette 25 into or out from receiving means 10.

Now assuming that the cassette 25 is manually inserted into the receiving means 10 in its raised non-operating position, any force acting upon the cassette 25 causes the front end of the receiving means 10 to turn down in a clockwise direction, as viewed in FIGS. 5 and 6, and in this manner, the receiving means 10 is firstly moved in a swinging manner into a horizontal position which is substantially parallel with the cassette-engaging base surface of the housing 1. It will be thus understood that subsequent movement of the receiving means 10 into the lowered basic operating position may be carried out in a substantially similar fashion to that of the first embodiment previously described.

It will be also understood that, in accordance with this third embodiment, the transversely the spaced slots 13 in the first embodiment are each replaced with a modified slot, indicated at 130 in FIGS. 5, which has vertical length to permit the front end of the receiving means 10 to tilt up with the small angle of elevation in the raised non-operating position.

FIGS. 7 to 10 illustrate a fourth embodiment of the present invention. In accordance with this fourth embodiment, the tension spring 26 used in the previously described embodiments is eliminated and alternatively a tension spring 36 is provided between the cassette receiving means 10 and the tape recorder housing 1 so that the receiving means 10 is yieldingly forced towards the lowered basic operating position. Further provided on the bottom wall of the receiving means 10 is a downwardly extended short leg 37, the lower end of which rests upon the uppermost end of a rocker arm 38 pivotally supported on a horizontal pin in the housing 1.

The rocker arm 38 is operatingly connected with the push button 32 through a suitable linkage mechanism in such a fashion that manual depression of the push button 32 results in rocking movement of the rocker arm 38 in a counterclockwise direction, as viewed in FIG. 8, into its upright attitude where the receiving means 10 is brought into its raised non-operating position against the action of the tension spring 36.

It is to be further noted that the fourth embodiment differs from the other embodiments, previously described, in the structure of the cassette ejector mechanism. This modified cassette ejector mechanism includes a pair of transversely spaced elongated members 39 which are each arranged to undergo forward and backward sliding movement along each side wall of the receiving means 10. These elongated members 39 are each provided at its rearmost end or the left-hand end, as viewed in FIGS. 7 and 8, with a plate portion 40 which is directed transversely of the receiving means 10. Provided on the lowest edge of the plate portion 40 is a vertical pin 41 which is extended downwardly through the longitudinal slot 23 in the bottom wall of the receiving means 10. The downwardly projecting pins 41 are yieldingly connected, through tension springs 24, to the stationary pins 22′ and 22′ affixed to the bottom wall of the receiving means 10. Consequently, the transversely opposed elongated members 39 are normally urged by the action of the respective tension springs 24 and 24, respectively, to the front opened end or the right-hand end, as viewed in FIGS. 7 and 8, of the receiving means 10.

As will be apparent from FIG. 9 showing an enlarged fragmentary section taken substantially along the line 9 — 9 in FIG. 7, it is preferred that the elongated member 39 is integrally formed with a rib extended horizontally along the longitudinal edge of the elongated member 39, while the cassette receiving means 10 is provided with transversely opposed channels or grooves 43 which are arranged in each side wall of the receiving means 10 and designed to receive therein ribs 42 of the elongated members 39 in a freely sliding manner.

This construction will result in that the elongated members 39 or cassette ejector means may be guided back and forth with certainty, accuracy and stability under co-operation of the ribs 42 with their associated channels 43.

It is to be further noted, in connection with this fourth embodiment, that the elongated members 39 each have such longitudinal dimension that, when they are freely biased to the normal position, i.e. the right-hand position, as viewed in FIGS. 7 and 8, their free ends extend out of the receiving means 10 and may be abutted or rest upon the transversely spaced cassette-guide surfaces 14 whereby the receiving means 10 is securely maintained in its raised non-operating position against the action of the tension spring 36.

Now referring to FIGS. 10A and 10B, there is illustrated insertion of the cassette 25 into the receiving means 10 in connection with the fourth embodiment. The cassette 25 is inserted into the receiving means 10 from the leading side thereof where the tape portion is exposed to the outside, under the guidance of cassette-guide surfaces 14.

The leading end of the cassette 25, upon reaching approximately halfway in the receiving means 10 as shown in FIG. 10A, comes into engagement with the plate portions 40 of the elongated members 39 which have been biased rightwardly. Additional manual depression acting upon the trailing end of the cassette 25 causes the elongated members 39 to move leftward, as viewed in FIG. 10A, against the action of the tension spring 24. Finally, as a result of this forced movement under the influence of the cassette 25, the right-hand free ends of the elongated members 39 slip off the cassette-guide surfaces 14 and, immediately after, the cassette 25 is completely inserted into the receiving means 10. In this condition, the tension spring 36 thrusts the receiving means 10 down into the basic operation position, i.e. the position shown in FIG. 10B, whereby the driving elements of the tape recorder come into engagement with the centers of the tape reels. It will be noted of course that, during the downward movement, the receiving means 10 is constantly kept in parallel relation with the cassette-engaging base surface of the housing 1 under the effect of the parallel arms 17.

When the cassette 25 is to be withdrawn from the receiving means 10, the push button 32 is manually depressed to cause the rocker arm 38 to upwardly displace the leg 37 of the receiving means 10 which is, in turn, moved upwardly into its raised non-operating position. Upon the receiving means 10 reaching this raised non-operating position, the elongated members 39 are both released so that the tension spring 24 automatically push the elongated members 39, that is, the cassette ejector means outwardly and, in this manner, the cassette 25 is ejected from the receiving means 10 by a certain distance. Simultaneously with this, the free ends of the elongated members 39 are again extended above and seated upon the cassette-guide surfaces 14 with the result that the receiving means 10 is locked or retained in the position shown in FIG. 10A, for removing the cassette 25 therefrom and then receiving therein a new tape cassette.

In accordance with the fourth embodiment described just above, there is provided an arrangement wherein the cassette ejector means by itself serves an additional purpose for locking the receiving means 10 in its raised non-operating position against the action of the tension spring 36. From the foregoing, it will be found that this modified arrangement provides an operational advantage for the cassette-loading means of the type in which the receiving means 10 is yieldingly urged downwardly by means of the tension spring 36, because the receiving means 10 is not free to unexpectedly move down into its basic operating position inasmuch as the cassette is introduced into the receiving means to thereby force the cassette ejector means rearwardly.

Finally, referring to FIGS. 11 to 14, there is illustrated a fifth modification of the present invention which is provided therein with a further modified cassette ejector means generally comprising a pair of transversely spaced ejector members 44 which are each arranged for back and forth sliding movement on and along each inner surface of the transversely opposed side walls of the receiving means 10 and formed in the configuration as shown in detail in FIG. 14. The ejector members 44 include respective longitudinal plate portions 45 which are each arranged on each inner surface of the receiving means 10 for back and forth movement. The ejector members 44 are further seated at their lowest longitudinal edges for free sliding movement respective in longitudinal channels or grooves 50 which are each provided at the longitudinal corner formed by the bottom wall and the side wall of the receiving means 10. Attached on the outer side of the longitudinal plate portion 45 45 is a laterally projecting pin 52 (particularly refer to FIG. 11) which is extended laterally through a longitudinal slot 51 for a freely sliding movement and which is, further, yieldingly connected through any one of tension springs 53 to its associated stationary pin 52 so as to be urged by the action of the tension spring 53 toward the front end of the receiving means 10 or into the position shown by the phantom line in FIG. 13. The longitudinal plate portion is further integrally provided at its rearmost end i.e. the left-hand end, as viewed in FIG. 13, with a transversely directed portion 54 which is, in turn, bent at the upper end thereof into a horizontal portion 55. It will be appreciated, from the foregoing, that the cassette 25 is, upon being inserted into the receiving means 10, abutted at its leading end against the transversely directed portions 54 so that any force exerted on the cassette 25 results in the movement of the ejector members into the right-hand position shown in solid lines in FIG. 13.

Transversely opposed vertical pins 56 are provided on respective horizontal portions 55. A transversely extended flat plate member 57 extends between the ejector members 44. The vertical pins 56 are engaged in opposed holes 58 in the plate member 57. In accordance with a feature of this fifth embodiment, when the receiving means is empty, the transversely extended flat plate member 57 serves to cover the recessed portion which is provided at the front open end in the top wall of the receiving means 10, for the purpose of preventing entry of dust into the receiving means 10.

While there have been illustrated and described the fundamental novel features of the invention as applied to a preferred embodiments, it will be understood that various modifications and variations in the form and details may be made by those skilled in the art without departing from the spirit of the invention.

What is claimed is:

1. A cassette tape recorder comprising, in combination:

a tape recorder housing including side walls, a top wall and a bottom wall, said bottom wall having a cassette-engaging surface with capstan shafts, cassette-locating means and reel shafts thereon;

cassette receiving means including side walls, a top wall and a bottom wall defining a hollow chamber adapted to receive therein a tape cassette, said hollow chamber being provided at one end thereof with a slot-like opening for entry and removal of the cassette into and from said chamber;

at least two parallel link bars of a substantially U-shaped form, said link bars being pivotally journalled at opposite ends thereof to the side walls of said housing just below said receiving means;

a pair of longitudinally extended plate-like members each having therein a longitudinally extended slot slidably receiving said link bars therein, said plate-like members being attached on respective side walls of the receiving means in a downwardly extending manner;

a pair of longitudinally extended link plates attached to respective of said plate-like members for free back and forth sliding movement relative to said plate-like member, said link plates each being provided with a pair of longitudinally spaced holes in which said link bars are pivotally connected so as to remain in parallel relation to each other; and means between said housing and said receiving means for vertically guiding said receiving means between its raised non-operating position and its lowered basic operating position in co-operation with said parallel link bars.

2. A cassette recorder as claimed in claim 1 wherein one of said parallel link bars is positioned nearer to said slot-like opening of the receiving means, said tape recorder housing having vertically elongated slots receiving the ends of said one bar whereby said receiving means may be held in its raised non-operating position in such an attitude that the front slot-like opening thereof is tilted upwardly with a small angle of elevation to facilitate insertion and removal of the cassette with respect to said receiving means.

3. A cassette recorder as claimed in claim 1 further comprising:

resilient means normally urging said cassette receiving means upwardly;

cassette ejector means mounted in said receiving means for back and forth sliding movement relative to said receiving means, said cassette ejector means including retractable lugs extending inwardly in said hollow chamber of said receiving means and engageable with the leading end of a cassette which has been introduced into said hollow chamber, and second resilient means acting on said cassette ejector means to yieldingly bias said lugs and apply force to expel the cassette out of said receiving means by a certain distance; and a transversely extended plate member connnected to said cassette ejector means so as to undergo back and forth movement together with said ejector means, said transversely extended plate member being positioned such that, upon insertion of the cassette into said receiving means, the plate member moves backwardly to open a recessed portion which is provided at the front end in the top wall of said receiving means so that the operator's fingers may exert pushing force upon the cassette until said receiving means is completely depressed to the lowered operating position.

4. A cassette tape recorder comprising, in combination:

a tape recorder housing including side walls, a top wall and a bottom wall, said bottom wall having a cassette-engaging surface with capstan shafts, cassette-locating means and reel shafts thereon;

cassette receiving means including side walls, a top wall and a bottom wall defining a hollow chamber adapted to receive therein a tape cassette, said hollow chamber being provided at one end thereof with a slot-like opening for entry and removal of the cassette into and from said chamber;

at least two parallel link bars of a substantially U-shaped form, said link bars being pivotally journalled at opposite ends thereof to the side walls of said housing just below said receiving means;

a pair of longitudinally extended plate-like members each having therein a longitudinally extended slot slidably receiving said link bars therein, said plate-like members being attached on respective side walls of the receiving means in a downwardly extending manner;

a pair of longitudinally extended link plates attached to respective of said plate-like members for free back and forth sliding movement relative to said plate-like member, said link plates each being provided with a pair of longitudinally spaced holes in which said link bars are pivotally connected so as to remain in parallel relation to each other;

means between said housing and said receiving means for vertically guiding said receiving means between its raised non-operating position and its lowered basic operating position in co-operation with said parallel link bars;

one of said parallel link bars being more remote from said slot-like opening in the receiving means, said housing being provided with holes larger in size than the diameter of said one link bar and pivotably receiving said one link bar to provide lost motion connection between said housing and said one link bar;

locking means for retaining said receiving means in its lowered operating position such that said receiving means may be tilted slightly with respect to said cassette-engaging surface of the tape recorder housing; and cassette-stabilizer means mounted on said cassette-engaging surface of the tape recorder housing and comprising a vertically slidable pin and resilient means urging the pin upwardly against the trailing end of said cassette in the receiving means so that the trailing end of said cassette can come into engagement with the top wall of said receiving means which has been tilted slightly, whereby said cassette is kept in its lowered operating position with stability.

5. A cassette recorder as claimed in claim 4 wherein the other of said parallel link bars is positioned nearer to said slot-like opening of the receiving means, said tape recorder housing having vertically elongated slots receiving the ends of said other bar whereby said receiving means may be held in its raised non-operating position in such an attitude that the front slot-like opening thereof is tilted upwardly with a small angle of elevation to facilitate insertion or removal of the cassette with respect to said receiving means.

6. A cassette recorder as claimed in claim 4 further comprising:

second resilient means normally urging said cassette receiving means upwardly;

cassette ejector means mounted in said receiving means for back and forth sliding movement relative to said receiving means, said cassette ejector means including retractable lugs extending inwardly in said hollow chamber of said receiving means and engageable with the leading end of a cassette which has been introduced into said hollow chamber, and third resilient means acting on said cassette ejector means to yieldingly bias said lugs and apply force to expel the cassette out of said receiving means by a certain distance; and a tranversely extended plate member connected to said cassette ejector means so as to undergo back and forth movement together with said ejector means, said transversely extended plate member being positioned such that, upon insertion of the cassette into said receiving means, the plate member moves backwardly to open a recessed portion which is provided at the front end in the top wall of said receiving means so that the operator's fingers may exert pushing force upon the cassette until said receiving means is completely depressed to the lowered operating position.

7. A cassette tape recorder comprising, in combination:

a tape recorder housing including side walls, a top wall and a bottom wall, said bottom wall having a cassette-engaging surface with capstan shafts, cassette-locating means and reel shafts thereon;

cassette receiving means including side walls, a top wall and a bottom wall defining a hollow chamber adapted to receive therein a tape cassette, said hollow chamber being provided at one end thereof with a slot-like opening for entry and removal of the cassette into and from said chamber;

at least two parallel link bars of a substantially U-shaped form, said link bars being pivotally journalled at opposite ends thereof to the side walls of said housing just below said receiving means;

a pair of longitudinally extended plate-like members each having therein a longitudinally extended slot slidably receiving said link bars therein, said plate-like members being attached on respective side walls of the receiving means in a downwardly extending manner;

a pair of longitudinally extended link plates attached to respective of said plate-like members for free back and forth sliding movement relative to said plate-like member, said link plates each being provided with a pair of longitudinally spaced holes in which said link bars are pivotally connected so as to remain in parallel relation to each other;

means between said housing and said receiving means for vertically guiding said receiving means between its raised non-operating position and its lowered basic operating position in co-operation with said parallel link bars;

transversely spaced members arranged adjacent said front end of said receiving means and providing guide surfaces for a cassette, said guide surfaces being flush with the bottom wall of said receiving means when the latter is in its raised non-operating position; and cassette ejector means including retractable lugs extending inwardly in said hollow chamber of said receiving means and engageable with the leading end of a cassette which has been inserted into said hollow chamber, resilient means acting on said cassette ejector means in a direction to eject the cassette out of said receiving means by a certain distance, said cassette ejector means having such longitudinal dimension that, when said receiving means is in its raised non-operating position, said ejector means contacts said guide surfaces to maintain said receiving means in its raised non-operating position.

8. A cassette tape recorder comprising, in combination:

a tape recorder housing including a cassette-engaging base surface with capstan shafts, cassette-locating means and reel shafts thereon;

cassette receiving means having one end with a slot-like opening to guide a cassette into said receiving means through said opening, said cassette receiving means being mounted above said tape recorder housing for vertical movement between a raised non-operating position and a lowered operating position, at least two parallel link bars of a substantially U-shaped form, said link bars being pivotally journalled at opposite ends thereof to the said housing just below said receiving means;

a pair of longitudinally extended plate-like members each having a longitudinally extended slot slidably receiving said link bars therein, said plate-like members each being attached to said receiving means on opposite sides thereof and extending downwardly therefrom;

a pair of longitudinally extended link plates attached to respective of said plate-like members for free back and forth sliding movement relative to said plate-like member, said link plates each being provided with a pair of longitudinally spaced-holes in which said link bars are pivotally connected so as to remain in parallel relation to each other;

means between said housing and said receiving means for vertically guiding said receiving means between its raised non-operating position and its lowered basic operating position in co-operation with said parallel link bars;

resilient means urging said receiving means upwardly to its raised non-operating position;

cassette ejector means mounted in said receiving means for free sliding movement, said cassette ejector means including lugs extending inwardly of said receiving means and engageable with the leading end of a cassette which has been introduced into said receiving means, and second resilient means urging said cassette ejector means in a direction in which the cassette is thrust out of said receiving means; and a transversely extended plate member connected to said cassette ejector means for movement therewith, said transversely extended plate member being positioned such that, upon insertion of the cassette into said receiving means, the plate member moves backwardly to open a recessed portion provided at the front of said receiving means so that the operator's fingers may exert pushing force upon the cassette until said receiving means is completely depressed to the lowered operating position.

* * * * *